United States Patent  (10) Patent No.: US 9,112,798 B1
Razazian et al.  (45) Date of Patent: Aug. 18, 2015

(54) POWER LINE COMMUNICATION DEVICE WITH CHANNEL LOAD MEASUREMENT AND IMPROVED CHANNEL ACCESS

(71) Applicant: Maxim Integrated Products, Inc., San Jose, CA (US)

(72) Inventors: Kaveh Razazian, Aliso Viejo, CA (US); Afshin Niktash, Irvine, CA (US); Victor Loginov, Irvine, CA (US); Nathan Goldstick, Irvine, CA (US)

(73) Assignee: MAXIM INTEGRATED PRODUCTS, INC., San Jose, CA (US)

( * ) Notice: Subject to any disclaimer, the term of this patent is extended or adjusted under 35 U.S.C. 154(b) by 266 days.

(21) Appl. No.: 13/713,896

(22) Filed: Dec. 13, 2012

(51) Int. Cl.
*H04L 12/413* (2006.01)
*H04L 12/43* (2006.01)
*H04L 12/825* (2013.01)

(52) U.S. Cl.
CPC ..................... *H04L 47/26* (2013.01)

(58) Field of Classification Search
USPC .................. 370/252, 445, 447, 459
See application file for complete search history.

(56) References Cited

U.S. PATENT DOCUMENTS

| | | | |
|---|---|---|---|
| 8,094,617 B2* | 1/2012 | Ki et al. | 370/329 |
| 8,189,462 B2* | 5/2012 | Kang et al. | 370/229 |
| 2004/0085992 A1* | 5/2004 | Wentink | 370/445 |
| 2006/0251086 A1* | 11/2006 | Ha et al. | 370/401 |
| 2006/0268768 A1* | 11/2006 | Harris et al. | 370/328 |
| 2010/0005166 A1* | 1/2010 | Chung | 709/224 |
| 2010/0008226 A1* | 1/2010 | Kang et al. | 370/235 |
| 2013/0250969 A1* | 9/2013 | Hui et al. | 370/437 |
| 2014/0233586 A1* | 8/2014 | Du et al. | 370/445 |

\* cited by examiner

*Primary Examiner* — Andrew Lee

(57) ABSTRACT

A power line communication (PLC) device includes a physical layer module including a transceiver configured to transmit and receive data over a power line. A medium access control (MAC) module is configured to send data to and process data from the physical layer module. The MAC module includes a channel access module configured to initiate a channel access attempt. The channel access module successively is configured to increase a random backoff period for a subsequent channel access attempt based on a random backoff function in response to a determination by the physical layer module that a PLC channel is busy during a preceding one of the channel access attempts. The channel access module successively is configured to selectively reset a variable in the random backoff function based on an output of a modulo function of a number of backoff attempts and a predetermined number.

41 Claims, 11 Drawing Sheets

POWER LINE COMMUNICATION DEVICE WITH CHANNEL LOAD MEASUREMENT AND IMPROVED CHANNEL ACCESS

FIELD

The present disclosure relates to power line communication (PLC) systems, and more particularly to a PLC device with channel load measurement and improved channel access.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Power line communications (PLC) systems transmit and receive signals from a utility to homes over existing power lines in the homes. PLC systems have been used to provide connectivity between a utility and power meters, appliances and other devices located in the homes of consumers. Some of the challenges to the implementation of PLC systems include the relatively noisy environment of the power lines, implementation costs, and transmitting and receiving signals across a transformer.

Channel access may be implemented using Carrier Sense Multiple Access with Collision Avoidance (CSMA/CA). Additional background relating to CSMA-CA can be found in IEEE 802.15.4:2006, IEEE Standard for Information Technology—Telecommunications and Information Exchange Between Systems—Local and Metropolitan Area Networks—Specific Requirements—Part 15.4: Wireless Medium Access (MAC) and Physical Layer (physical layer) Specifications for Low-Rate Wireless Personal Area Networks (WPANs).

A random backoff period is used to spread the time during which PLC devices attempt to transmit, which reduces the probability of collisions. Each time that a PLC device attempts to transmit data frames, the PLC device waits the random backoff period. If the channel is idle after the random backoff period, the PLC device transmits the data. If the channel is busy after the random backoff period, the PLC device waits another random backoff period before attempting to access the channel again.

In large power line communication systems, an estimate of channel traffic may be used to avoid excessive collisions when conducting frequent transmission attempts while the chance of success is very low. For example, when a node is trying to associate and join a network, the node sends a data request. All of the nodes in the network that receive the request respond with a response. If the network is busy, there is a high probability that many of the requests or data frames will collide with other packets and corrupt the other packets. The joining node may not receive any detectable response and will try again, which may create more data traffic and collisions. This type of failure can make the channel even busier by creating a lot of collisions. As a result, the effective throughput of the channel decreases.

If the joining node is able to determine that the network is busy, instead of back-to-back retries, the joining node can wait for a predetermined period to allow the network to settle. If the success likelihood of an attempt is too low, then it is better to not even try to communicate. The added communication of the attempt increases the network load without producing any benefit and while disrupting the communication of other nodes.

SUMMARY

A power line communication (PLC) device includes a physical layer module including a transceiver configured to transmit and receive data over a power line. A medium access control (MAC) module is configured to send data to and process data from the physical layer module. The MAC module includes a channel access module configured to initiate a channel access attempt. The channel access module is configured to successively increase a random backoff period for a subsequent channel access attempt based on a random backoff function in response to a determination by the physical layer module that a PLC channel is busy during a preceding one of the channel access attempts. The channel access module is configured to selectively reset a variable in the random backoff function based on an output of a modulo function of a number of backoff attempts and a predetermined number.

A power line communication (PLC) device includes a physical layer module including a transceiver configured to transmit and receive data over a power line. A medium access control (MAC) module configured to send data to and process data from the physical layer module. The MAC module includes a load measurement module. During an observation period, the load measurement module is configured to: determine whether a frame detect event has occurred. The load measurement module is configured to, for each frame detect event, determine an amount of time between the frame detect event and one of (i) a frame receive event and (ii) a predetermined period; and calculate a frame length based on at least two of the frame detect event, the frame receive event and the predetermined period.

A method for operating a power line communication (PLC) device includes initiating a channel access attempt; successively increasing a random backoff period for a subsequent channel access attempt based on a random backoff function in response to a determination that a PLC channel is busy during a preceding one of the channel access attempts; and selectively resetting a variable in the random backoff function based on an output of a modulo function of a number of backoff attempts and a predetermined number.

A method for operating a power line communication (PLC) device is disclosed. The method includes, during an observation period, determining whether a frame detect event has occurred; for each frame detect event: determining an amount of time between the frame detect event and one of (i) a frame receive event and (ii) a predetermined period; and calculating a frame length based on at least two of the frame detect event, the frame receive event and the predetermined period.

Further areas of applicability of the present disclosure will become apparent from the detailed description, the claims and the drawings. The detailed description and specific examples are intended for purposes of illustration only and are not intended to limit the scope of the disclosure.

DESCRIPTION

Figure 1:
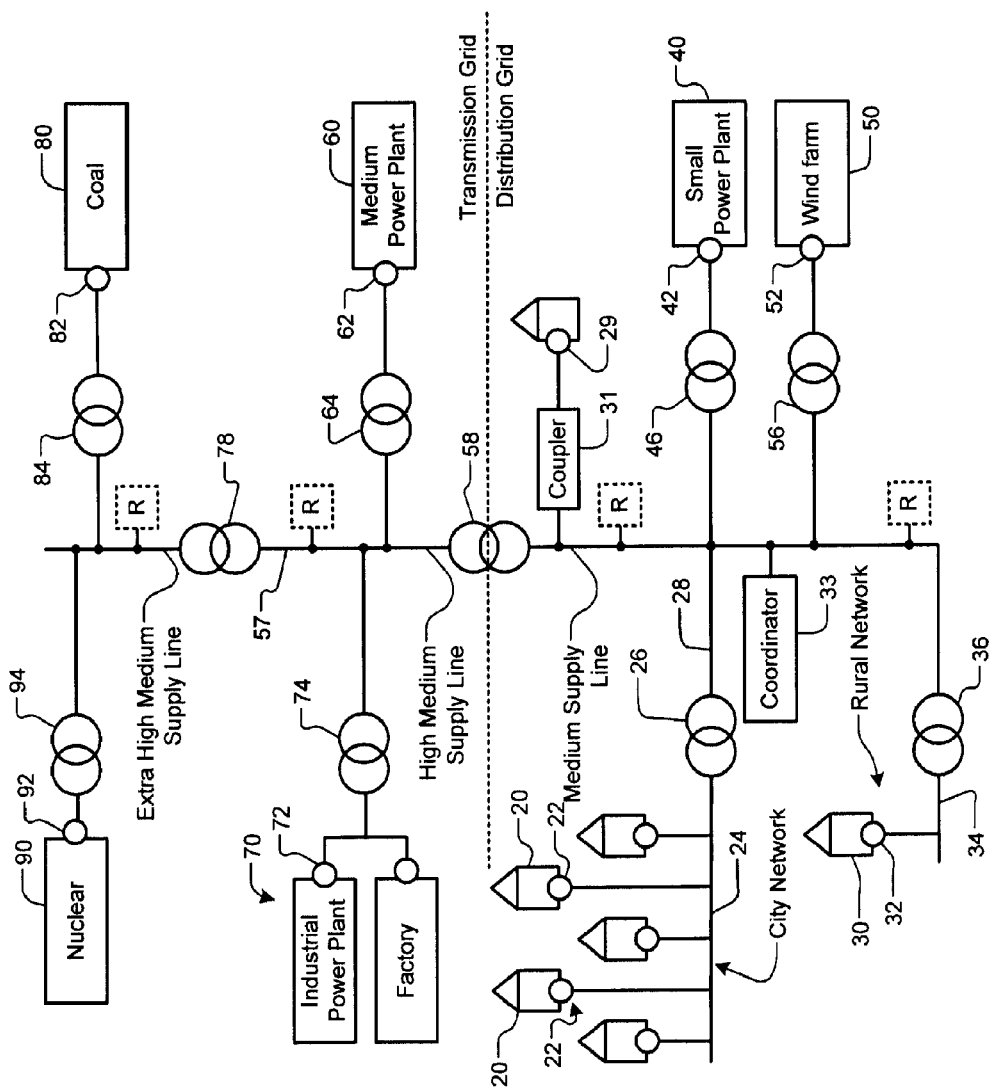
FIG. 1 illustrates an example of a PLC system according to the present disclosure.

Referring now to FIG. 1, an example of a power system is shown. The power system includes a city network with one or more homes 20 that are connected by a PLC device 22 to a power line 24. The power line 24 is connected by a transformer 26 to a medium supply line 28. In some examples, a PLC device 29 may also be connected directly (without a transformer) to the medium supply line 28 by a coupler 31, which may serve as a network coordinator or a repeater. One or more network coordinators 33 may be connected to the medium supply line 28. The power system may also be connected via a transformer 36 to a rural network including one or more homes 30 connected by a PLC device 32 to a power line 34. The medium supply line 28 may also communicate with a PLC device 42 associated with a small power plant 40 through a transformer 46. The medium supply line 28 may also communicate with a PLC device 52 associated with a wind farm 50 through a transformer 56.

The medium supply line 28 may communicate with a high medium supply line 57 through a transformer 58. A PLC device 62 associated with a medium power plant 60 may communicate with the high medium supply line 57 through a transformer 64. A PLC device 72 associated with an industrial power plant and factory 70 may communicate with the high medium supply line 57 through a transformer 74.

An extra high medium supply line 76 may communicate with the high medium supply line 57 through a transformer 78. A PLC device 82 associated with a coal plant 80 may communicate with the extra high medium supply line 76 through a transformer 84. Likewise, a PLC device 92 associated with a nuclear plant 90 may communicate with the extra high-voltage line 76 through a transformer 94. One or more routers R or network coordinators (not shown) may be provided as intermediate nodes to receive, forward and route packets between the PLC devices. In some examples, a transformer is located between the source node and the destination node. In other examples, communication can take place over the medium supply line without any transformer between source and destination nodes.

Figure 2:
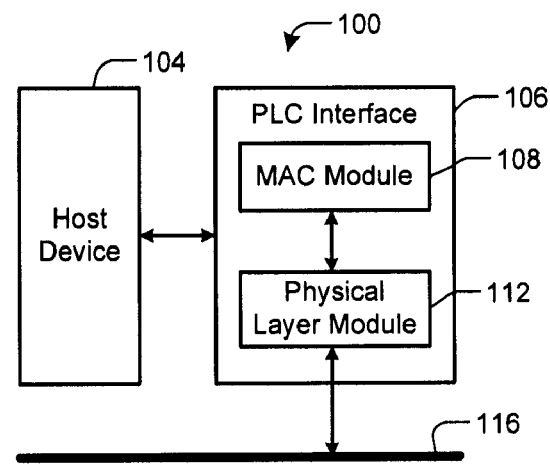
FIG. 2 is a functional block diagram of an example of a PLC device according to the present disclosure.
Figure 3:
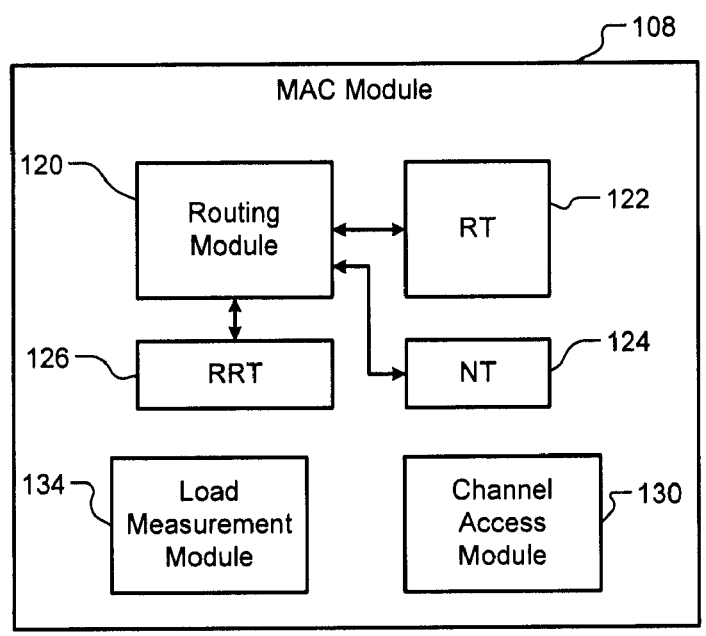
FIG. 3 is a functional block diagram of an example of a MAC module according to the present disclosure.

Referring now to FIGS. 2 and 3, an example of a PLC device 100 is shown. The PLC device 100 includes a host device 104 and a PLC interface 106. The PLC interface 106 includes a medium access control (MAC) module 108 and a physical layer (physical layer) module 112. In some implementations, the MAC module 108 includes both the Media Access Control Layer and an Adaptation Layer of the PLC device 100. The physical layer module 112 provides connectivity with a medium such as a power line 116. The MAC module 108 performs higher-level processing of the transmitted and received data.

In FIG. 3, some examples of the MAC module 108 may include a routing module 120, a routing table (RT) 122, a neighbor table (NT) 124 and a route request table (RRT). In some implementations, the routing module 120, the RT 122, the NT 124 and the RRT 126 may be located in the Adaptation Layer of the MAC module 108. Additional details relating to the routing module 120, the RT 122, the NT 124 and the RRT 126 may be found in U.S. patent application Ser. No. 13/708,008, filed on Dec. 7, 2012, which is hereby incorporated by reference in its entirety. The MAC module 108 may include a channel access module 130 to assist with channel access. The MAC module 108 may include a channel load measurement module 134 to estimate traffic on the PLC channel, as will be described further below.

Figure 4A:
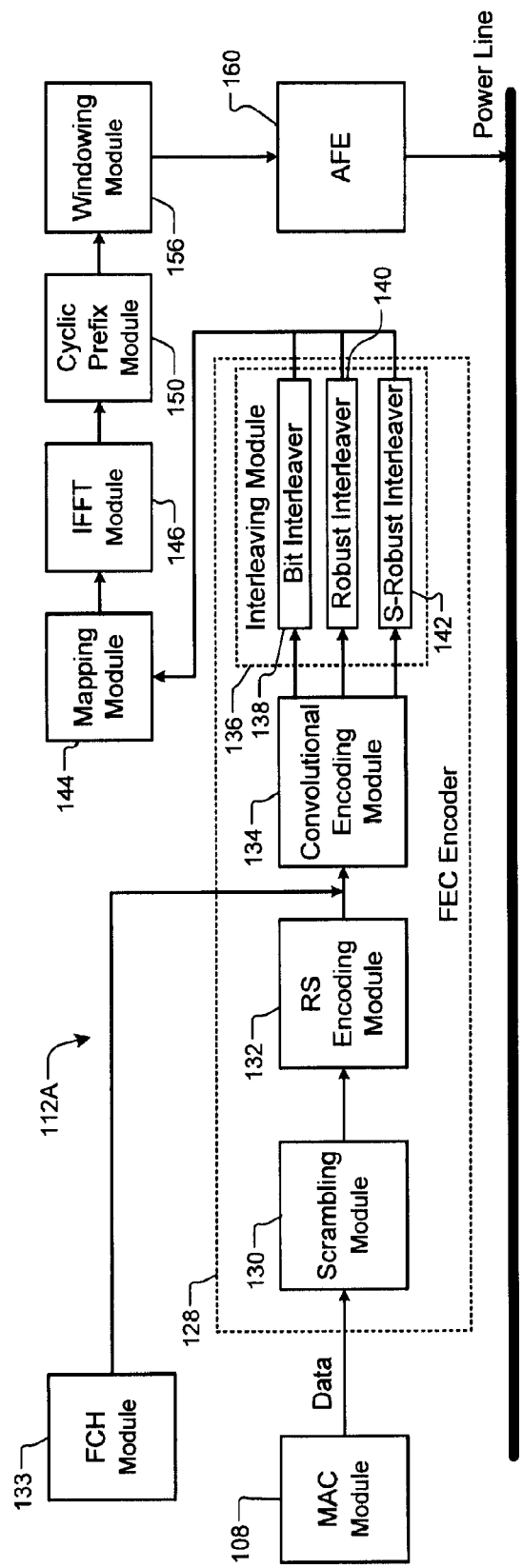
FIGS. 4A and 4B are functional block diagrams of examples of a transmitter and a receiver, respectively, according to the present disclosure.

Referring now to FIG. 4A, an example of a transmitter portion of the physical layer module 112A is shown. The MAC module 108 outputs data to a forward error correction (FEC) encoding module 128. The FEC encoding module 128 performs encoding and includes a scrambling module 130 to scramble the data, a Reed Solomon (RS) encoding module 132 to perform RS encoding, a convolutional encoding module 134 to perform convolutional encoding and an interleaving module 136 to perform interleaving. An output of a frame control header (FCH) module generates a frame control header for the packets and communicates with an input of the convolutional encoding module 134.

The interleaving module 136 includes a bit interleaver 138, a robust interleaver 140 and a super robust interleaver 142. An output of the FEC encoding module 128 is input to a mapping module 144 that performs orthogonal frequency division multiplexing (OFDM) mapping such as but not limited to differentially-encoded binary phase shift keying (DBPSK), differentially-encoded quadrature phase shift keying (DQPSK) and/or other types of modulation. An output of the mapping module 144 is input to an inverse fast Fourier transform (IFFT) module 146. An output of the IFFT module 146 is input to a cyclic prefix module 150. An output of the cyclic prefix module is input to a windowing module 156. An output of the windowing module 156 is input to an analog front end 160.

Figure 4B:
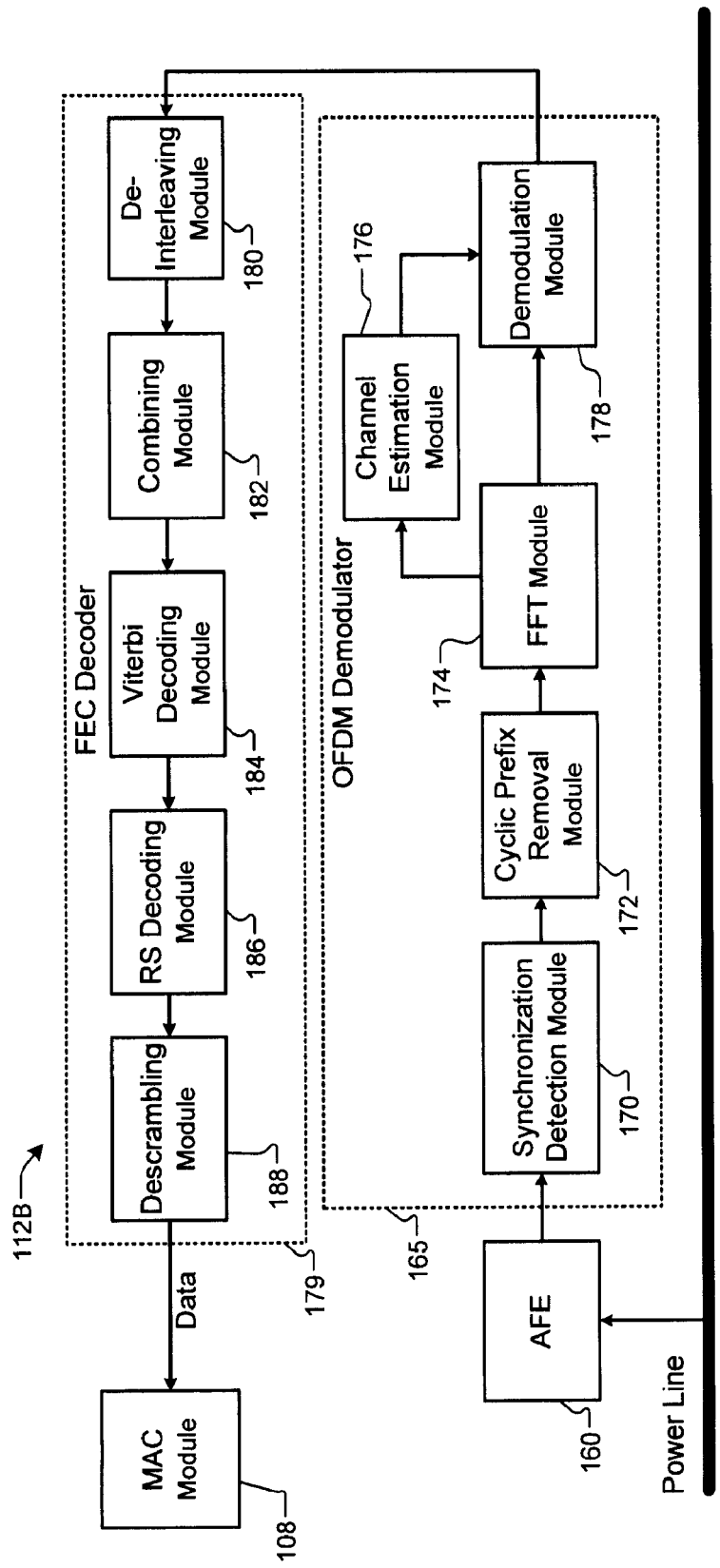

Referring now to FIG. 4B, an example of a receiver portion of the physical layer module 112B is shown. The analog front end (AFE) 160 communicates with the power line and outputs a received signal to an OFDM demodulating module 165. The OFDM demodulating module 165 includes a synchronization detection module 170, a cyclic prefix (CP) removal module 172, a fast Fourier transform (FFT) module 174, a channel estimation module 176, and a demodulation module 178.

An output of the OFDM demodulating module 165 is input to a FEC decoding module 179. The FEC decoding module 179 includes a de-interleaving module 180, a combining module 182, a Viterbi decoding module 184, a RS decoding module 186 and a descrambling module 188. An output of the FEC decoding module 179 provides data to the MAC module 108.

Additional details relating to the transmitter and receiver modules described above can be found in "SYSTEM AND METHOD FOR APPLYING MULTI-TONE OFDM BASED COMMUNICATIONS WITHIN A PRESCRIBED FRE- QUENCY RANGE", U.S. Pat. No. 8,315,152, and "TRANSMITTER AND METHOD FOR APPLYING MULTI-TONE OFDM BASED COMMUNICATIONS WITHIN A LOWER FREQUENCY RANGE", U.S. patent application Ser. No. 12/795,537, filed on Jun. 7, 2010, which are both hereby incorporated by reference in their entirety.

The transceivers disclosed therein use a combination of adaptive tone mapping, interleaving in frequency and time, and robust and super-robust encoding modes to provide reliable communication on a power line channel. The transceivers may operate in a frequency band from 1 kHz to 600 kHz. The transceivers use adaptive tone mapping, which involves requesting a tone map from a link partner. The transceiver associated with the link partner performs channel estimation, generates the tone map and sends the tone map to the requesting transceiver. The requesting transceiver uses the tone map to update its NT and modulates an output of the encoding module to selected orthogonal tones located in the frequency band based on a mapping table received form the link partner. In some implementations, frequency pre-emphasis may be used to pre-emphasize at least one or more of the selected orthogonal tones to compensate for estimated attenuation during propagation of a transmitted signal. When using the foregoing signal processing techniques, the transceivers are able to transmit and receive across a transformer to the transceiver associated with the link partner.

Figure 5:
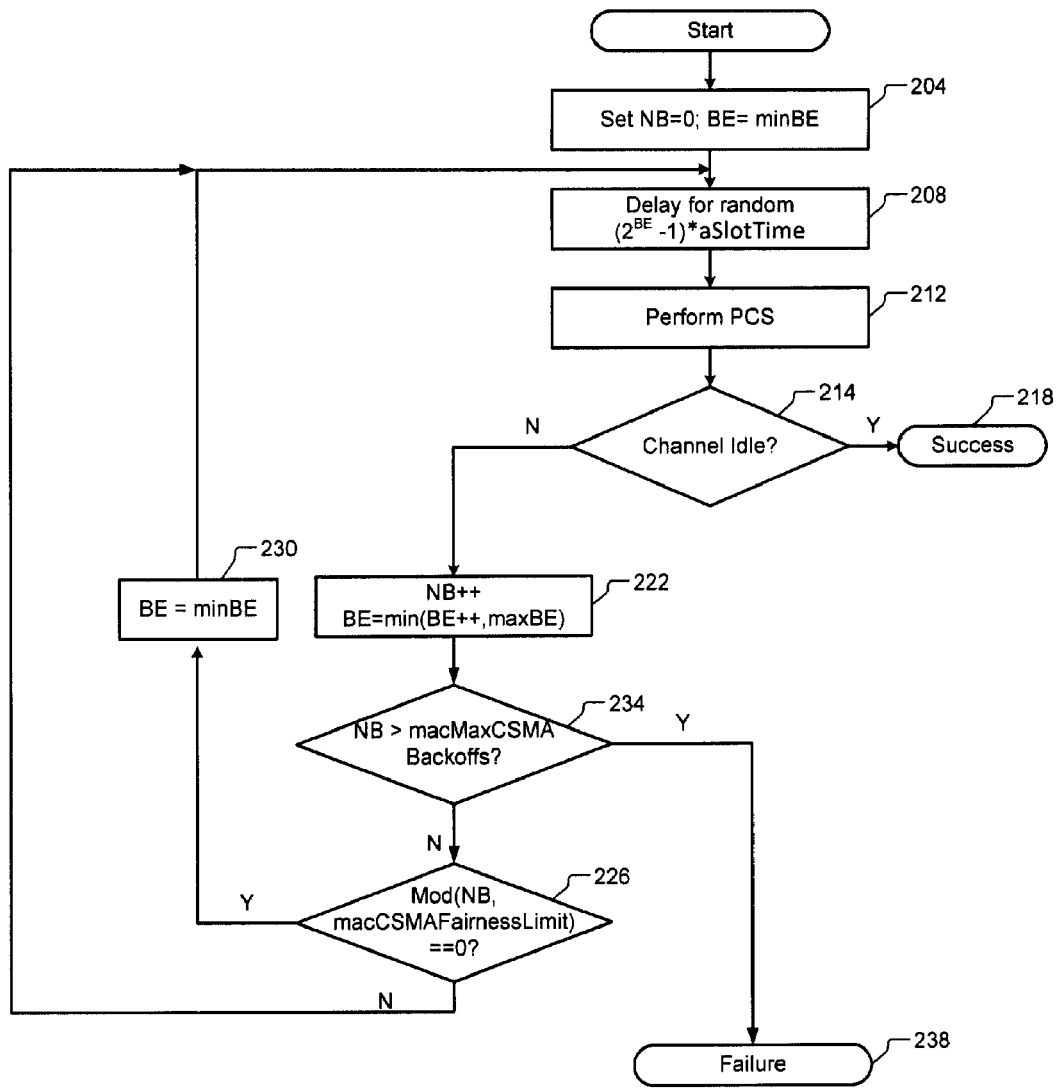
FIG. 5 is a flowchart illustrating an example of an improved method for performing channel access according to the present disclosure.

Referring now to FIG. 5, an example of a method for operating a channel access module 130 of the MAC module 108 according to the present disclosure is shown. The channel access module 130 implements channel access using units of time called aSlotTime. Each PLC device maintains two variables for each transmission attempt. A number of backoffs (NB) refers to the number of times the channel access method has been used with backoff while attempting the current transmission. NB may be initialized to 0 before each new transmission attempt. A backoff exponent (BE) refers to an exponent that determines the number of backoff periods a device waits before attempting to assess a channel. BE may be initialized to the value of minBE.

In FIG. 5, the MAC module 108 initializes NB to 0 and BE to minBE at 204. At 208, the MAC module 108 delays for period equal to a random number of backoff periods in the range from 0 to $2^{BE}-1$ multiplied by the aSlotTime (or Backoff Time=Random($2^{BE}-1$)*aSlotTime). At 212, after the delay period, the MAC module 108 requests that the physical layer module 112 perform a Physical Carrier Sense (PCS) to determine whether the channel is busy or idle. If the channel is busy as determined by the physical layer module 112, the MAC module 108 increments both NB and BE at 222. BE is limited to a maximum value maxBE. The MAC module 108 determines at 234 whether the value of NB is greater than or equal to macMaxCSMABackoffs. If 234 is false, control continues to 226. If the value of NB is greater than macMaxCSMABackoffs as determined at 234, control terminates with a Channel Access Failure status.

In order to improve the overall channel access fairness, the MAC module 108 determines whether mod(NB,macCSMAFairnessLimit)=0, where mod is a modulo operation at 226. If 226 is true, BE is reduced to minBE at 230 and control continues with 208. For example only, if macCSMAFairnessLimit=15 and macMaxCSMABackoffs=50, as soon as the number of backoffs (NB) reaches 15, 30 and 45, mod(NB, macCSMAFairnessLimit)=0 and BE is reduced to minBE at 230. If 226 is false, control returns to 208. If the channel is assessed to be idle at 214, the MAC module 108 begins transmission of the frame.

If multiple PLC devices are trying to transmit at the same time, the PLC device that acquired the channel first has a higher chance to continue to acquire the channel for subsequent transmissions. However, other PLC devices that fail to access the channel will increase their waiting time (random backoff) up to the maximum value: $(2^{maxBE}-1)$*aSlotTime.

Therefore, these PLC devices have a lower chance to acquire the channel. This may cause a fairness issue and channel access failure for the PLC devices with longer pending transmission attempts. The channel access system and method improves the channel access fairness by allowing other PLC devices to compete for the channel by reducing their random backoff contention window to a minimum value after several unsuccessful channel access attempts (macCSMAFairnessLimit). The CSMA parameters including minBE and maxBE may be selected based on the number of PLC devices in the network competing for the channel.

In addition, to further improve the fairness, a transmitting device may choose to limit the total number of back-to-back transmissions to the channel to allow other devices to access the channel.

Figure 6:
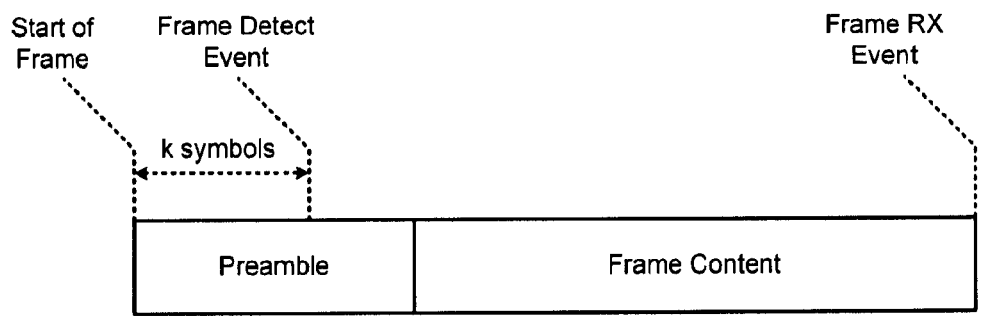
FIG. 6 illustrates an example of detection of a packet including a preamble and frame content.

Referring now to FIGS. 6-12, operation of the load measurement module 134 will be described. In FIG. 6, a reasonable estimate of a channel load can be calculated using the timing of various packet events. The timing of the packet events may be determined by the physical layer module 112 and sent to the MAC module 108. The physical layer module 112 uses known preamble symbols to sync with a frame as shown in FIG. 6. In general, the physical layer module 112 detects a frame after receiving first k preamble symbols (a Frame Detect Event). Once the frame is complete, the physical layer module 112 detects an end of the frame (a Frame RX Event). The timing of these two events can be used to detect the length of the packet.

A total frame length of the frame i, $T_i$ is estimated as:

$$T_i = k * \text{symbol time} + (\text{Frame } RX \text{ Event Time} - \text{Frame Detect Event Time})$$

If the Frame RX Event is not received due to packet corruption or collisions or other factors, the total frame length $T_i$ may be set to a maximum possible size of a packet.

Figure 7:
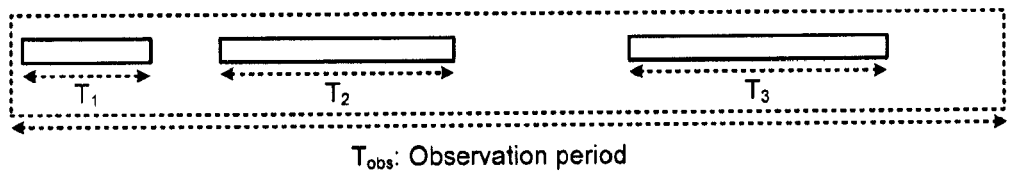
FIG. 7 illustrates an example of an observation period.

Referring now to FIG. 7, an example of a method for estimating the channel loading by observing the packets in a PLC system is shown. Total busy time is measured by adding total frame length of all observed frames during an observation period, $T_{obs}$. For example for the example in FIG. 7:

$$T_{busy} = T_1 + T_2 + T_3$$

The channel load is defined as the percentage of time during which there are packets in the channel within an observation window:

$$\text{Channel Load} = 100 * T_{busy}/T_{obs}$$

Note that a noisy channel may still be idle, so long as no other PLC devices are actively transmitting. Furthermore, if the signal level of received packets from other devices is so low that it cannot be detected, it appears as noise to the PLC device and does not constitute channel load. The observation window dictates how often the channel load estimation is updated. For example, the observation window may be 5 sec, although other values may be used.

Figure 8:
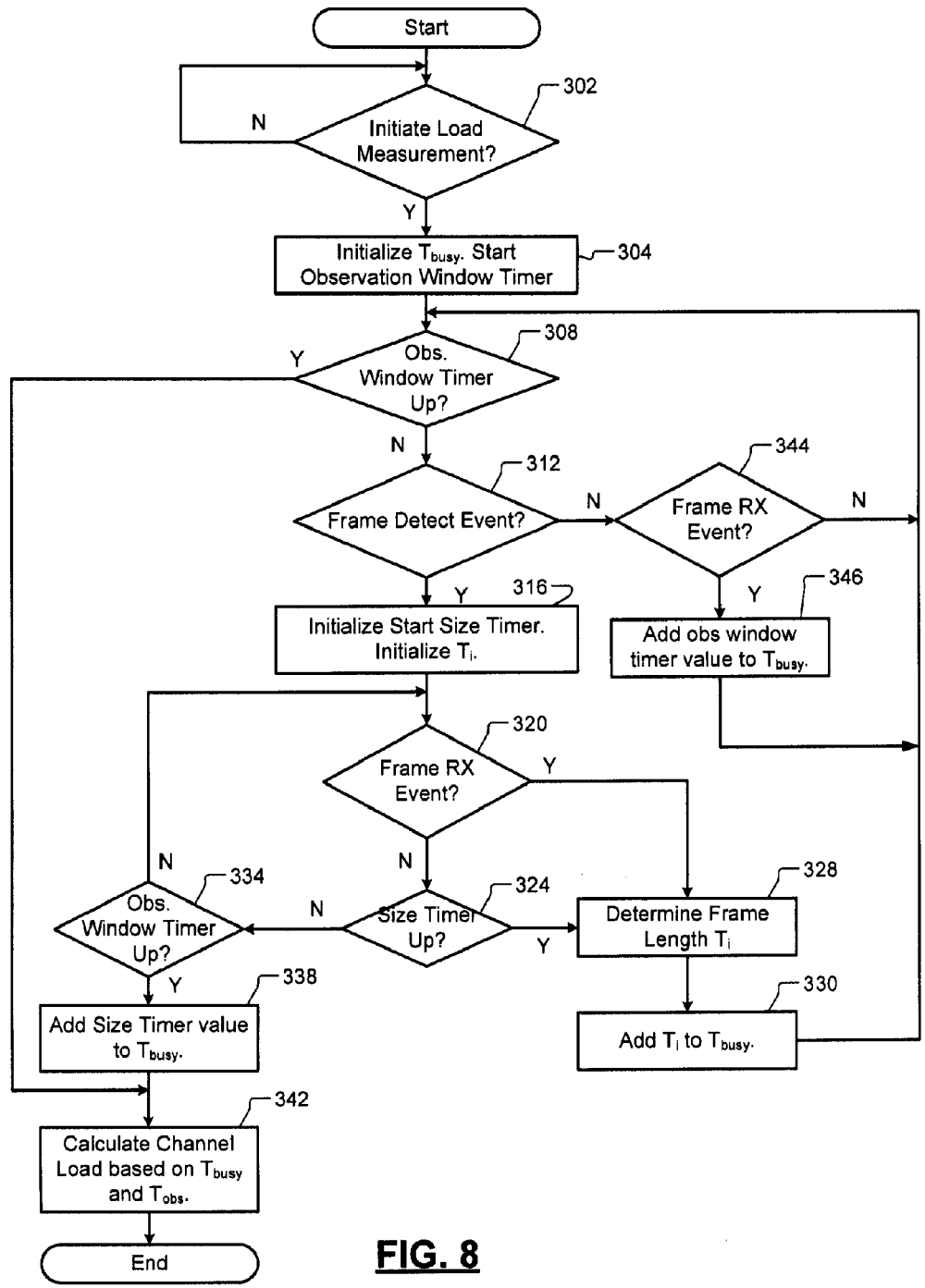
FIG. 8 is a flowchart illustrating an example of a channel load measurement according to the present disclosure.

Referring now to FIG. 8, an example of a method for load measurement system is shown. At 302, control determines whether a load measurement is needed. If 302 is true, control initializes $T_{busy}$ and starts an observation window timer at 304. At 308, control determines whether the observation window timer is up.

If 308 is false (the observation period is not up), control determines whether there is a frame detect event at 312. If 312 is false, control check at 344 if a frame RX event is observed as the remaining of a frame from previous observation window. If 344 is true, the value of observation window timer is added to $T_{busy}$ at 346 and returns to 308. If 344 is false, control returns to 308. This portion of the method captures a case where at the end of the observation period, the frame is not finished. The next observation window starts with RX event of the frame started in previous window.

If 312 is true, control resets and starts a timer and resets $T_i$. At 320, control determines whether a frame RX event occurred. If 320 is true, control determines the frame length $T_i$. If 320 is false, control determines whether the timer is up. If 324 is true, control continues at 328 and determines the frame length using the maximum packet length. Control continues from 328 with 338 where control adds $T_i$ to $T_{busy}$ and then control returns to 308. If 324 is false, control determines whether the observation window timer is up at 334. If 334 is false, control returns to 320. If 334 is true, control adds the Size timer value to $T_{busy}$ to capture a packet that has started but not finished at 338. Control continues from 308 and 338 with 342. At 342, control calculates the channel load based on $T_{busy}$ and $T_{obs}$ and then control ends.

If a monitoring node only sees acknowledgment packets without seeing any data packets, the monitoring node can conclude that a node should have sent a data or command packet to another node before the acknowledgement packet was sent. In other words, the acknowledgment packet received by the monitoring node is a response to a data or command packet. Therefore, the monitoring node can conclude that the monitoring node was not able to detect the data or command packet due to collisions, a bad channel or other reasons. This situation can correspond to a hidden node scenario. In this case, the monitoring node may further adjust $T_{busy}$ before calculation of the channel load by adding a maximum length of a packet or other predetermined period to $T_{busy}$. If the monitoring node has any other information that requires further adjustments to $T_{busy}$, the monitoring node may update $T_{busy}$ prior to computation of channel load.

Figure 9:
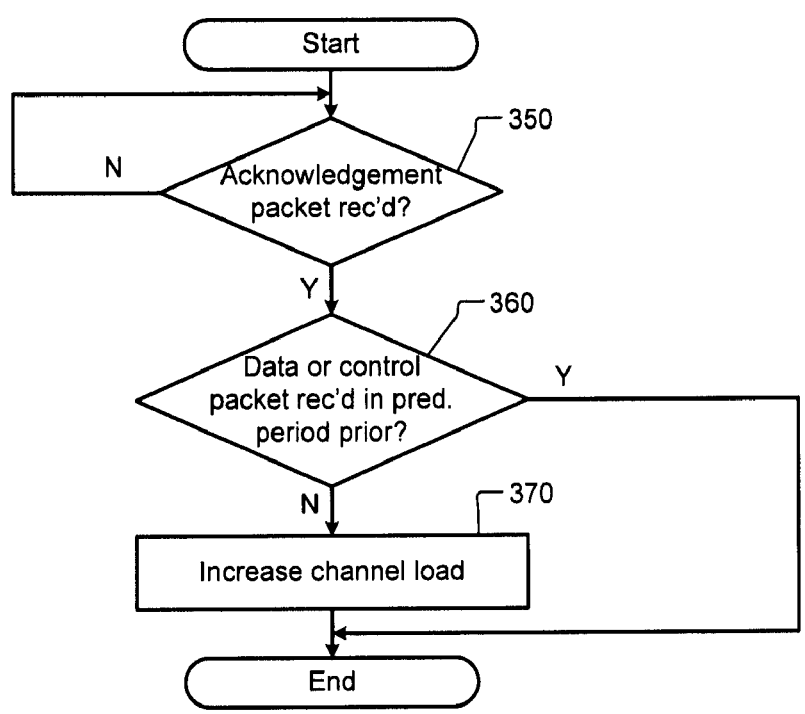
FIG. 9 is a flowchart illustrating an example of adjusting a channel load based on an acknowledgement packet.

Referring now to FIG. 9, an example of a method for selectively increasing the channel load based on an acknowledgement packet is shown. At 350, the load measurement module determines whether an acknowledgement packet is received. At 360, the load measurement module determines whether a data or control packet was previously received within a predetermined period. If 360 is true, control ends. If 360 is false, the load management module selectively increases the channel load.

In some implementations, the channel load can be a scaled value. For example, the scale can be 0-255 range (where 0 corresponds to a free channel and 255 corresponds to a busy channel) and be represented by a byte.

Figure 10:
FIG. 10 illustrates a first example of an observation period.
Figure 11:
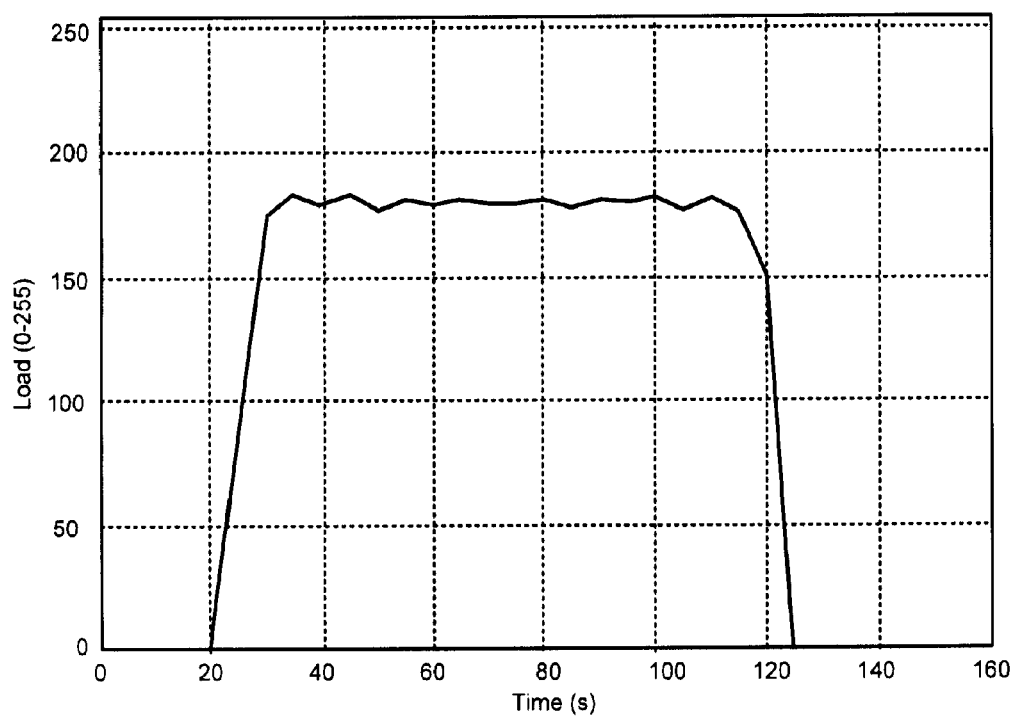
FIG. 11 illustrates a load measurement for the first example in FIG. 8.

Referring now to FIGS. 10 and 11, an example load measurement is shown. In FIG. 10, a power line channel is shown after a series of phase shift key (PSK) packets were sent. The transmission started after about 20 sec and ended after about 120 sec. In FIG. 10, the estimated channel load is scaled 0-255. The observation period is 5 sec, which means that the graph is updated every 5 sec. Note that a moving average function can be used after calculation of the channel load. To do so, the last m results of the channel load are averaged and reported as the estimated channel load.

Figure 12:
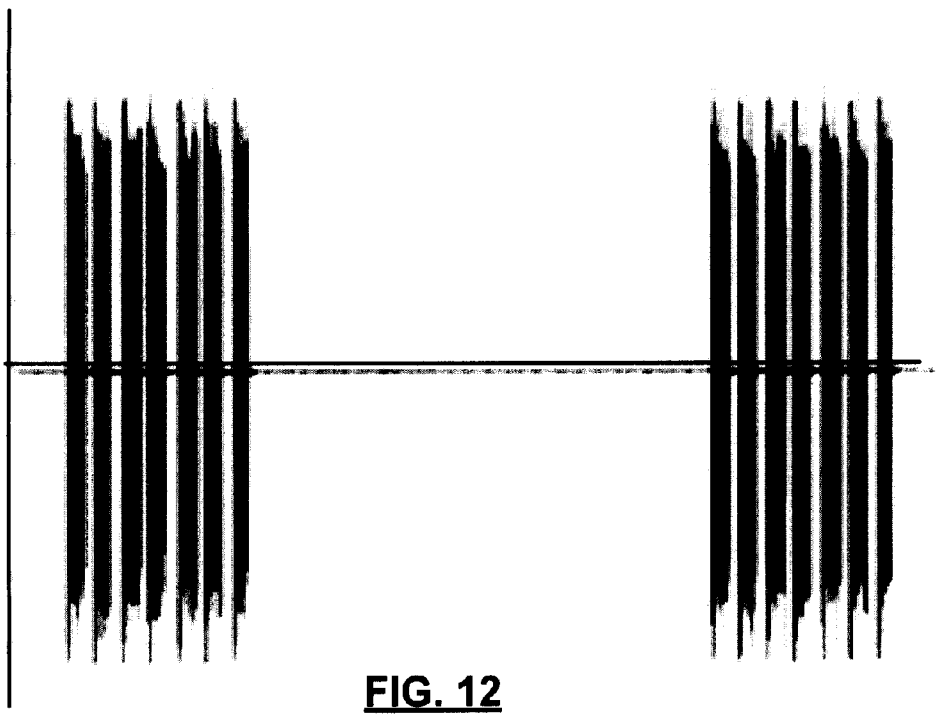
FIG. 12 illustrates a second example of an observation period.
Figure 13:
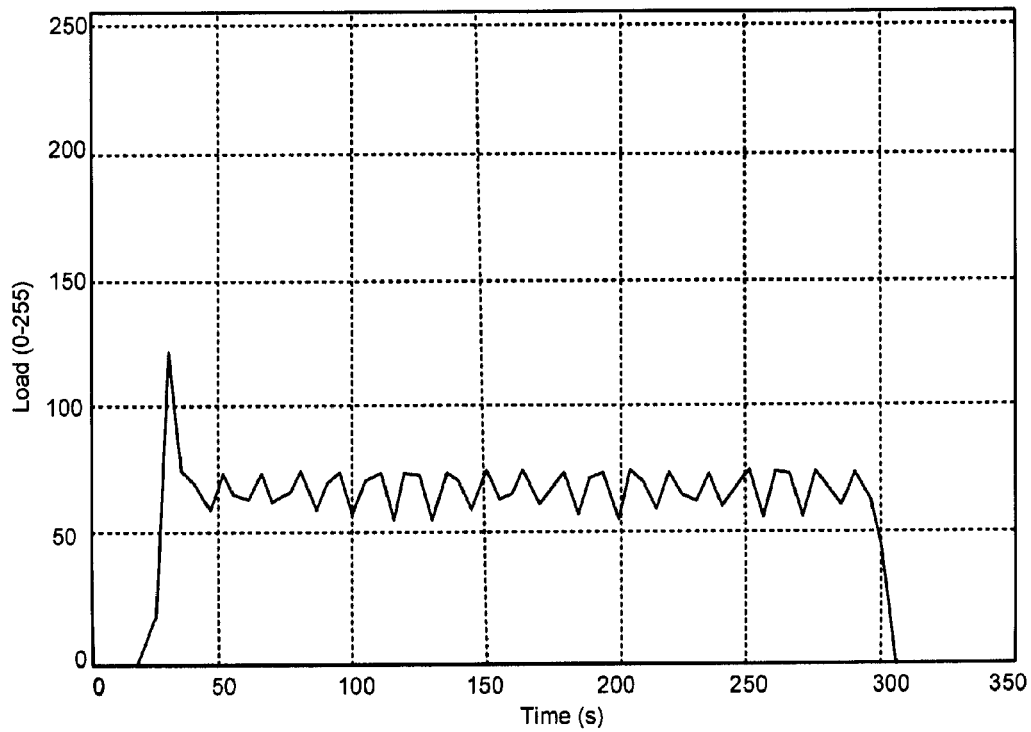
FIG. 13 illustrates a load measurement for the second example in FIG. 12.

Referring now to FIGS. 12 and 13, another example load measurement is shown. In FIG. 12, a channel is shown after a series of bursts. The channel loading is shown in FIG. 13. The channel loading dropped significantly from about 180 in FIGS. 9-10 to about 70 in this example.

Figure 14:
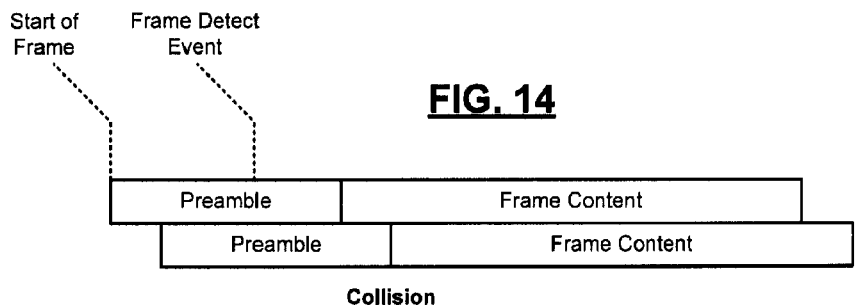
FIG. 14 illustrates an example of a collision.

If two packets collide in such a way that the preambles cannot be detected, the frame detect events and the frame receive events will not occur. In FIG. 14, a condition is shown when two packets sent from two nodes collide over the power line such that even the minimum number of preamble symbols needed for a receiver to detect a frame (k symbols) is not collision free. In this situation, even the preambles are corrupted such that a receiver cannot detect the frame and none of the above mentioned events are sensed. The load measurement module 134 does not see this activity as traffic and will conclude that the channel is idle.

To alleviate the above problem, the load measurement module 134 is able to differentiate between busy and free load conditions. If a monitoring node does not sense any traffic and determines that the channel is free, the load measurement module 134 of the monitoring node may periodically send a traffic test packet to one or more neighbor nodes to confirm or reject the estimated load measurement.

The monitoring node (the node attempting to confirm the load measurement) checks the neighbor table to identify a neighbor with a high quality link. For example, the neighbor node with the highest link quality indicator (LQI) value (that has not aged out) can be selected. In other examples, different parameters can be used to select the neighbor node. Examples include age of the measurement (how long since the last communication with the node), modulation, LQI, the tone map parameters, and/or other parameters.

The monitoring node periodically sends the traffic test packet to the selected neighbor node. The type, size and content of traffic test packet can be varied as needed. The monitoring node may also report any prior information about the channel loading to the destination node using traffic test packets or any other packet types and the destination node may also use the information in the channel load computation as well. The neighbor node sends an acknowledgment packet if it receives the traffic test packet. No other specific response packet may be required. However, if the neighbor node has information about the channel load, the neighbor node may send the channel load information embedded in the acknowledgment packet or any other packet type back to monitoring node and monitoring node may include that in channel load computation. Since the traffic test packet is considered to be a management packet, the neighbor node may detect the traffic test packet and discard the traffic test packet without further processing.

If the monitoring node does not receive the acknowledgment packet within a predetermined period, the monitoring node can reasonably conclude that there was a collision. Note the monitoring node expected a high quality link with the selected neighbor. Furthermore, the channel access was granted before the monitoring node transmitted the traffic test packet (for example using traditional CSMA/CA or the channel access module described above). This means that the channel is so busy that even the channel access module did not detect the packets and granted access or there was a collision. In this case, the channel load value can be set to a maximum value (corresponding to busy) for that period. If the monitoring node receives the acknowledgment packet, the monitoring node verifies that the channel was free. As a result, the monitoring node can keep the channel load at a minimum value (e.g. free).

Figure 15:
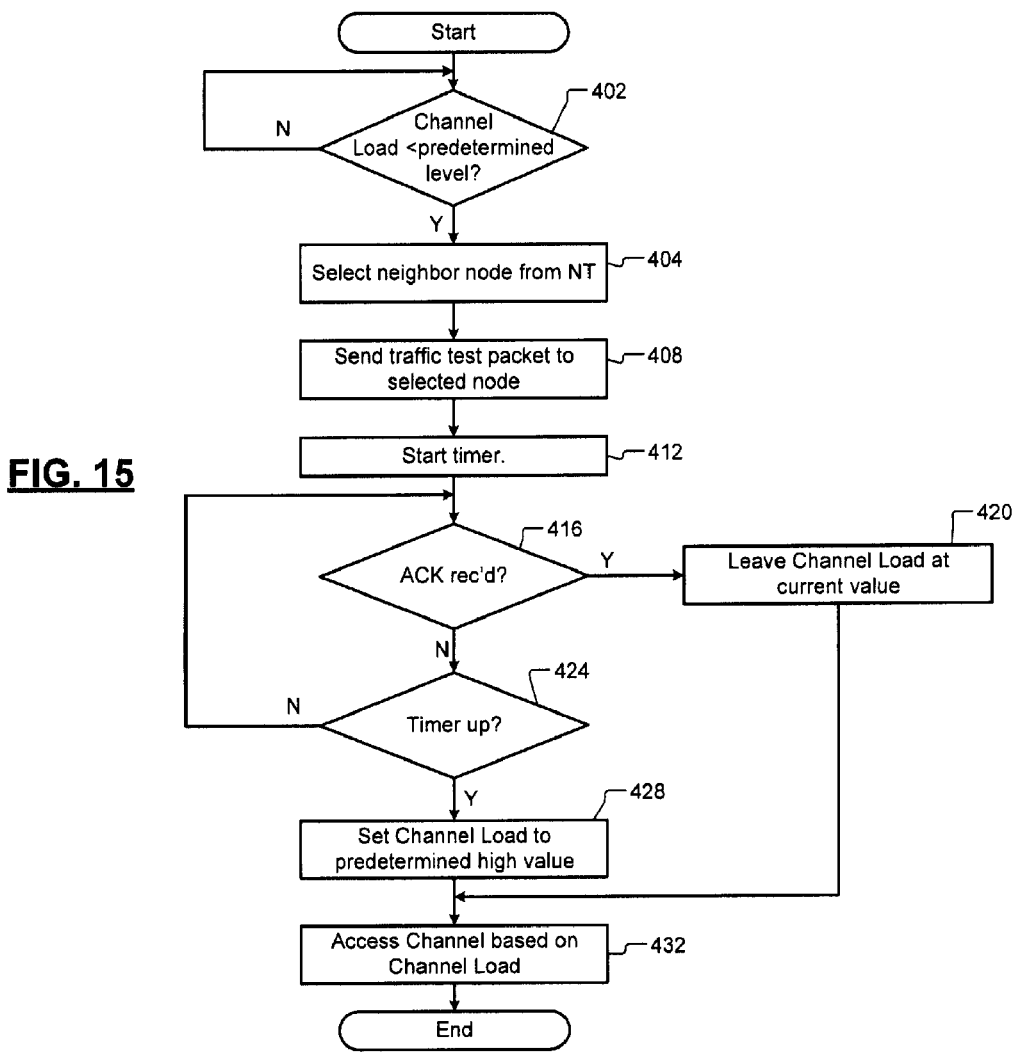
FIG. 15 is a flowchart illustrating an example of a method for confirming a channel load measurement.

Referring now to FIG. 15, a method used by a monitoring node for confirming that a light channel load measurement is correct is shown. At 402, control determines whether the channel load is less than a predetermined channel load level.

For example, the predetermined channel load level may correspond to very low or free channel load condition. If 402 is true, control may select a neighbor node from the neighbor table (NT). At 408, control may send a traffic test packet to the selected node from the neighbor table. The neighbor node may be selected from the neighbor table using any suitable criteria. In some examples, the monitoring node may select the neighbor node having the highest quality link with the monitoring node or selects from a group of links having link quality above a predetermined link quality.

At 412, control starts a timer. At 416, control determines whether an acknowledgment (ACK) packet has been received. If true, control continues at 420 and leaves the channel load value at the current value or reduces the value which may correspond to idle channel condition. If 416 is false, control determines whether the timer is up. If 424 is false, control returns to 416. If 424 is true, control sets the channel load measurement value to a higher load value, which may correspond to a busy load condition. At 432, the monitoring node accesses the PLC channel based on the channel load measurement value (as adjusted by the results of the test packet testing) and control ends.

In order to make sure that the estimated Channel Load is not drastically affected by occasional bursts, it can be averaged during multiple periods. In other words, a moving average of N measurements can be used, where N is an integer greater than one.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should be not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A power line communication (PLC) device, comprising:
    a physical layer module including a transceiver configured to transmit and receive data over a power line;
    a medium access control (MAC) module configured to send data to and process data from the physical layer module,
    wherein the MAC module includes a channel access module configured to:
        initiate a channel access attempt;
        successively increase a random backoff period for a subsequent channel access attempt based on a random backoff function in response to a determination by the physical layer module that a PLC channel is busy during a preceding one of the channel access attempts; and
        selectively reset a variable in the random backoff function based on an output of a modulo function of a number of backoff attempts and a predetermined number.

2. The PLC device of claim 1, wherein the random backoff function is equal to random($2^{BE}-1$)*aSlotTime, where random is a random function, BE is a backoff exponent and aSlotTime is a minimum slot time unit.

3. The PLC device of claim 2, wherein the MAC module initially sets BE to a minimum value.

4. The PLC device of claim 1, wherein the MAC module compares the number of backoff attempts to a predetermined maximum number of backoff attempts and declares a transmit failure when a number of channel access attempts is greater than the predetermined maximum number of backoff attempts.

5. The PLC device of claim 2, wherein BE corresponds to the variable in the random backoff function that is reset when the modulo function is equal to zero, wherein BE is reset to a predetermined minimum value.

6. The PLC device of claim 1, wherein the variable in the random backoff function is reset when the modulo function is equal to zero.

7. A power line communication (PLC) device, comprising:
    a physical layer module including a transceiver configured to transmit and receive data over a power line; and
    a medium access control (MAC) module configured to send data to and process data from the physical layer module,
    wherein the MAC module includes a load measurement module, and
    wherein during an observation period, the load measurement module is configured to:
        determine whether a frame detect event has occurred;
        for each frame detect event:
            determine an amount of time between the frame detect event and one of (i) a frame receive event and (ii) a predetermined period; and calculate a frame length based on at least two of the frame detect event, the frame receive event and the predetermined period.

8. The PLC device of claim 7, wherein the load measurement module is further configured to determine a busy period based on a sum of the frame lengths for each of the frame detect events.

9. The PLC device of claim 8 wherein the load measurement module is further configured to determine a channel load based on the busy period and the observation period.

10. The PLC device of claim 9, wherein the load measurement module calculates a moving average of N samples of the channel load, where N is an integer greater than one.

11. The PLC device of claim 7, wherein the frame length is equal to a symbol period multiplied by a predetermined number of symbols plus a difference between a time of the frame receive event and a time of the frame detect event.

12. The PLC device of claim 7, wherein when the load measurement module senses an estimated channel load that is less than a predetermined load, the load measurement module is configured to:
  select a neighbor node from a neighbor table in the MAC module;
  send a traffic test packet to the selected neighbor node; and
  adjust the estimated channel load based on whether an acknowledgement packet is received from the neighbor node.

13. The PLC device of claim 12, wherein the neighbor node selected by the load measurement module from the neighbor table is selected based on link quality.

14. The PLC device of claim 12, wherein the neighbor node selected by the load measurement module is selected based on one or more of parameters related to a link between the PLC device and the neighbor node.

15. The PLC device of claim 12, wherein the load measurement module waits a predetermined period for the acknowledgement packet, and wherein the load measurement module increases the estimated channel load if the acknowledgement packet is not received during the predetermined period.

16. The PLC device of claim 12, wherein the load measurement module waits a predetermined period for the acknowledgement packet, and wherein the load measurement module decreases the estimated channel load or leaves the estimated channel load unchanged if the acknowledgement packet is received during the predetermined period.

17. The PLC device of claim 12, wherein the acknowledgement packet includes channel load information generated by the neighbor node, and wherein the channel load generated by the load measurement module is based on the channel load information.

18. The PLC device of claim 12, wherein the traffic test packet includes channel load information generated by the PLC device.

19. The PLC device of claim 9, wherein when the load measurement module senses an acknowledgement packet and did not sense a data packet or a control packet within a predetermined prior to the acknowledgement packet, the load measurement module increases the channel load.

20. The PLC device of claim 8, wherein when the load measurement module detects the frame receive event during the observation period without detecting the frame detect event preceding the frame receive event during the observation period, the load measurement module adds a value of the observation period when the frame receive event occurred to the busy period.

21. A method for operating a power line communication (PLC) device, comprising:
  initiating a channel access attempt;
  successively increasing a random backoff period for a subsequent channel access attempt based on a random backoff function in response to a determination that a PLC channel is busy during a preceding one of the channel access attempts; and
  selectively resetting a variable in the random backoff function based on an output of a modulo function of a number of backoff attempts and a predetermined number.

22. The method of claim 21, wherein the random backoff function is equal to random($2^{BE}-1$)*aSlotTime, where random is a random function, BE is a backoff exponent and aSlotTime is a minimum slot time unit.

23. The method of claim 22, further comprising initially setting BE to a minimum value.

24. The method of claim 21, further comprising:
  comparing the number of backoff attempts to a predetermined maximum number of backoff attempts; and
  declaring a transmit failure when a number of channel access attempts is greater than the predetermined maximum number of backoff attempts.

25. The method of claim 22, wherein BE corresponds to the variable in the random backoff function that is reset when the modulo function is equal to zero, wherein BE is reset to a predetermined minimum value.

26. The method of claim 21, wherein the variable in the random backoff function is reset when the modulo function is equal to zero.

27. A method for operating a power line communication (PLC) device, comprising:
  during an observation period:
    determining whether a frame detect event has occurred;
    for each frame detect event:
      determining an amount of time between the frame detect event and one of (i) a frame receive event and (ii) a predetermined period; and
      calculating a frame length based on at least two of the frame detect event, the frame receive event and the predetermined period.

28. The method of claim 27, further comprising determining a busy period based on a sum of the frame lengths for each of the frame detect events.

29. The method of claim 28 further comprising determining a channel load based on the busy period and the observation period.

30. The method of claim 29, further comprising calculating a moving average of N samples of the channel load, where N is an integer greater than one.

31. The method of claim 27, wherein the frame length is equal to a symbol period multiplied by a predetermined number of symbols plus a difference between a time of the frame receive event and a time of the frame detect event.

32. The method of claim 27, further comprising:
  when an estimated channel load that is less than a predetermined load:
    selecting a neighbor node from a neighbor table;
    sending a traffic test packet to the selected neighbor node; and
    adjusting the estimated channel load based on whether an acknowledgement packet is received from the neighbor node.

33. The method of claim 32, wherein the neighbor node selected from the neighbor table is selected based on link quality.

34. The method of claim 32, wherein the neighbor node is selected based on one or more of parameters related to a link between the PLC device and the neighbor node.

35. The method of claim 32, further comprising:
waiting a predetermined period for the acknowledgement packet; and
increasing the estimated channel load if the acknowledgement packet is not received during the predetermined period.

36. The method of claim 32, further comprising:
waiting a predetermined period for the acknowledgement packet; and
decreasing the estimated channel load or leaves the estimated channel load unchanged if the acknowledgement packet is received during the predetermined period.

37. The method of claim 32, wherein the acknowledgement packet includes channel load information generated by the neighbor node, and wherein the channel load is based on the channel load information.

38. The method of claim 32, wherein the traffic test packet includes channel load information generated by the PLC device.

39. The method of claim 29, further comprising:
increasing the channel load when an acknowledgement packet is sensed and a data packet or a control packet was not sensed within a predetermined prior to the acknowledgement packet.

40. The method of claim 28, further comprising adding a value of the observation period to the busy period when the frame receive event is detected during the observation period without detecting the frame detect event preceding the frame receive event during the observation period.

41. The PLC device of claim 1, wherein the channel access module limits a total number of back-to-back transmissions.

\* \* \* \* \*